(12) United States Patent
Fox et al.

(10) Patent No.: US 11,277,453 B2
(45) Date of Patent: Mar. 15, 2022

(54) MEDIA COMMUNICATION MANAGEMENT

(71) Applicant: International Business Machines Corporation, Armonk, NY (US)

(72) Inventors: Jeremy R. Fox, Georgetown, TX (US); Kelley Anders, East New Market, MD (US); Liam S. Harpur, Dublin (IE); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/422,095

(22) Filed: May 24, 2019

(65) Prior Publication Data
US 2020/0374328 A1    Nov. 26, 2020

(51) Int. Cl.
| | | |
|---|---|---|
| *H04L 29/06* | (2006.01) | |
| *H04L 29/08* | (2006.01) | |
| *H04L 12/707* | (2013.01) | |
| *G06F 40/205* | (2020.01) | |
| *H04L 65/403* | (2022.01) | |
| *H04L 67/50* | (2022.01) | |
| *H04L 65/1083* | (2022.01) | |
| *H04L 45/00* | (2022.01) | |

(52) U.S. Cl.
CPC .......... *H04L 65/403* (2013.01); *G06F 40/205* (2020.01); *H04L 45/22* (2013.01); *H04L 65/1083* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 9,021,021 B2 | 4/2015 | Backholm | |
| 9,317,887 B2* | 4/2016 | Lee | G06Q 50/01 |
| 9,762,733 B1* | 9/2017 | Ramanujaiaha | H04M 3/42068 |
| 2009/0259441 A1 | 10/2009 | Yoshikai | |
| 2010/0142369 A1 | 6/2010 | Gottwerth | |
| 2011/0060800 A1* | 3/2011 | Cohen | G06Q 10/107 709/206 |
| 2015/0046553 A1 | 2/2015 | Debenedictis | |

(Continued)

FOREIGN PATENT DOCUMENTS

| | | | | |
|---|---|---|---|---|
| GB | 2398452 A | * | 8/2004 | H04L 1/20 |

OTHER PUBLICATIONS

Cross et al., "Collaborative Overload," Harvard Business Review, Issue Jan.-Feb. 2016, 12 pages. <https://hbr.org/2016/01/collaborative-overload>.

(Continued)

*Primary Examiner* — Mohamed Ibrahim
(74) *Attorney, Agent, or Firm* — Brian D. Welle (57) ABSTRACT

Communication between a plurality of users on one or more media platforms is analyzed. A model of the communication that reflects trends of the communication is generated. Using the model, it is determined that a current communication between a first and second user of the media platform is relatively less efficient than a potential communication between the first user and a third user of the media platform. In response to determining that the current communication is relatively less efficient than the potential communication, the current communication is directed to the third person.

20 Claims, 3 Drawing Sheets

(56) References Cited

U.S. PATENT DOCUMENTS

| | | | |
|---|---|---|---|
| 2015/0341297 A1* | 11/2015 | Barfield, Jr. | H04L 51/14 |
| | | | 709/206 |
| 2016/0162456 A1* | 6/2016 | Munro | G06F 40/137 |
| | | | 704/9 |
| 2018/0268502 A1 | 9/2018 | Benfield | |
| 2018/0270265 A1 | 9/2018 | Sage | |

OTHER PUBLICATIONS

Cross et al., "Collaboration Without Burnout" Harvard Business Review, Issue Jul.-Aug. 2018, 11 pages. <https://hbr.org/2018/07/collaboration-without-burnout>.

"The digital workplace: Think, share, do," Deloitte, accessed May 6, 2019, 20 pages. <https://www2.deloitte.com/content/dam/Deloitte/mx/Documents/human-capital/The_digital_workplace.pdf>.

"The Importance of Collaboration in Today's Workplace" Elcom, Oct. 31, 2016, 9 pages. <https://www.elcomcms.com/resources/blog/the-importance-of-collaboration-in-todays-workplace>.

Hamm, "Pairing Cognitive Technologies with Sensors for Better Fitness and Health," Jan. 6, 2016, 9 pages. <https://www.ibm.com/blogs/think/2016/01/pairing-cognitive-technologies-with-sensors-for-better-fitness-and-health/>.

\* cited by examiner

MEDIA COMMUNICATION MANAGEMENT

BACKGROUND

The present disclosure relates to communication between users across one or more media platforms. Increasingly, organizations are using media platforms to help users collaborate and work together across the world and across time zones in addition to or in lieu of in-person or telephone conversations. Media platforms can include such platforms as electronic mail servers, social media applications, and chatting applications or the like. Communication across media platforms may include text exchanges, video chat, file exchanges, or the like. Organizations may monitor such media platform communication to understand how communication flows between users of the various media platforms.

SUMMARY

Aspects of the present disclosure relate to a method, system, and computer program product relating to management of communication across media platforms. For example, the method includes analyzing communication between a plurality of users on one or more media platforms. A model of the communication that reflects trends of the communication is generated. Using the model, it is determined that a current communication between a first and second user of the media platform is relatively less efficient than a potential communication between the first user and a third user of the media platform. In response to determining that the current communication is relatively less efficient than the potential communication, the current communication is directed to the third person.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

Aspects of the present disclosure relate to managing communication across one or more media platforms, and more particular aspects relate to detecting inefficiencies in communication and redirecting communication toward more efficient channels. While the present disclosure is not necessarily limited to such applications, various aspects of the disclosure may be appreciated through a discussion of various examples using this context.

Online communication, whether purposefully routed or incidentally traversing through a plurality of users, is often routed with suboptimal efficiency. For example, one or more users may take a relatively long period of time to respond to communication, or communication may get stuck in a back-and-forth loop between users for a relatively long period of time, or communication may get forwarded between numerous users with none taking substantial action, or the like. Organizations may lose efficiency and/or waste resources as a result of communication being directed along such suboptimal paths before being resolved or otherwise addressed.

Aspects of the disclosure are related to detecting inefficient communication, and subsequently redirecting the inefficient communication towards a potential communication that is determined to be relatively more efficient. A computer may be configured to monitor communication across media platforms for speed of communication, scale of communication (e.g., a total number of users or messages involved in communication), shape of communication (e.g., as from a graphical representation that depicts users as larger or smaller and/or closer to or further away from each other depending upon detected communication trends), or the like. The computer may determine that communication is more or less efficient depending upon whether the communication has relatively more or less of these attributes or otherwise better utilizes these attributes. Communication may be redirected by the computer from a relatively less efficient path to a potential communication that is determined to be relatively more efficient.

Figure 1:
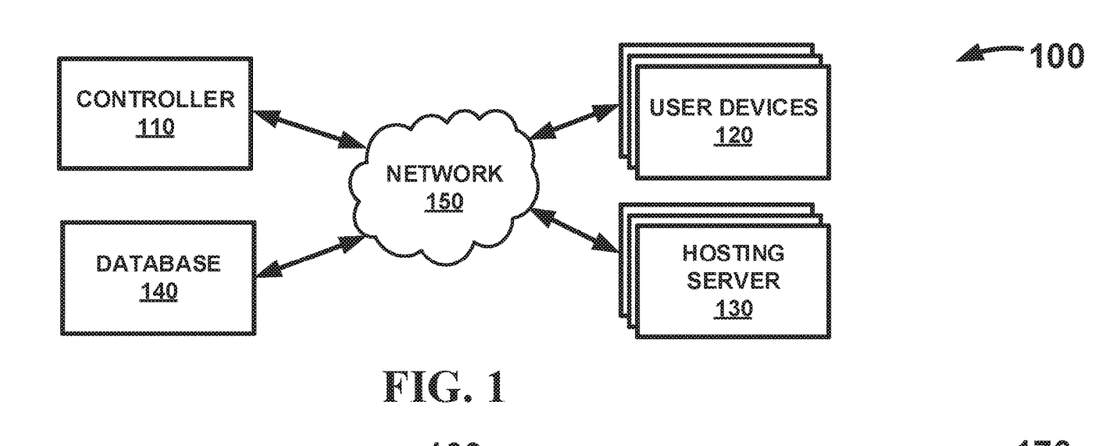
FIG. 1 depicts a conceptual diagram of an example system in which a controller manages communication between a plurality of user devices across a network using a media platform hosted by a hosting server.

For example, FIG. 1 depicts system 100 that includes controller 110 that is configured to manage media communication by redirecting communication to relatively more efficient paths. Controller 110 may include a computing device, such as computing device 200 of FIG. 3 that includes processor 220 communicatively coupled to memory 230 that includes instructions 240 that, when executed by processor 220, cause controller 110 to execute the operations described below. Controller 110 may be configured to manage communication from a plurality of users that are using a plurality of user devices 120. User devices 120 may include computing devices (similar to computing device 200 of FIG. 3 as described below) such as laptops, desktop computers, mobile phones, or the like. User devices 120 may include a processor communicatively coupled to a memory, as described herein.

User devices 120 may communicate on one or more media platforms hosted by one or more hosting servers 130. For example, one of hosting servers 130 may host a social media platform across which users 120 may chat, send instant messages, communicate over a video conference, or the like. Additionally, or alternatively, one of hosting servers 130 may include an email server or the like across which users may send electronic mail or the like. Hosting servers 130 may include computing device such as laptops, desktops, servers, racks of servers, or the like.

User devices 120 may access hosting servers 130 over network 150. Network 150 may include a computing network over which computing messages may be sent and/or received. For example, network 150 may include the Internet, a local area network (LAN), a wide area network (WAN), a wireless network, or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user devices 120, hosting servers 130, and database 140) may receive messages and/or instructions from and/or through network 150 and forwards the messages and/or instructions for storage or execution or the like to a respective memory or processor of the respective computing/processing device.

Controller 110 may monitor communication between user devices 120 on media platforms hosted by one or more hosting servers 130. Controller 110 may gather communication data regarding communication between user device 120, and use such gathered data to create a communication model. The communication model may indicate general baselines and trends of communication between user across network 150. For example, the communication model may include one or many thresholds that indicate normalized behavior, such that communication "within" these thresholds is efficient and communication "outside" (or that otherwise does not satisfy) these thresholds as inefficient. For another example, the communication model may include many (e.g., a few hundred or a few thousand or more) or even all previous messages that have been sent on the social media platforms accessible to controller 110, such that controller 110 may dynamically determine changing normalized behavior (and therein update thresholds as necessary).

Controller 110 may store gathered communication data, including any communication models, in database 140 for use. Database 140 may be a computing device (e.g., similar to computing device 200 of FIG. 3 as described below) such as a laptop, desktop, server, rack of servers, or the like. Controller 110 may store data on and/or retrieve communication data database 140 using network 150.

Controller 110 may monitor messages in many different manners in order to generate the model. For example, controller may monitor messages across network 150 in order to generate the model. In such examples, network 150 may be or otherwise include a private network over which controller 110 has administrative privileges, such that controller 110 is configured to determine a source, destination, and general content of some or all messages sent across network 150.

Additionally, or alternatively, controller 110 may generate a communication model by monitoring messages across one or more user devices 120. For example, user devices 120 may be owned by a company or organization that provides administrator privileges to controller 110 to monitor some or all messages across user devices 120. Controller 110 may use one or more computing agents on user devices 120 to monitor communication on user devices 120. Computing agents may monitor traffic across computing interfaces (e.g., such as interface 210 of computing device 200 of FIG. 3) to identify communication being sent or received by respective user devices 120. Additionally, or alternatively, user devices 120 may be configured to affirmatively send some or all sent or received communication to respective computing agents on user devices 120 (or directly send some or all communication directly to controller 110 over network 150).

Additionally, or alternatively, controller 110 may generate a communication model by monitoring messages across on hosting servers 130. For example, one or more hosting servers 130 may be owned by a company or organization that provides administrator privileges to controller 110 to monitor some or all messages on one or more media platforms hosted by the owned hosting servers 130. Similar to agents on user devices 130 as described above, controller 110 may use one or more remote computing agents that are on hosting server 130 to gather communication, and/or hosting server 130 may be configured to send some or all communication to controller 110 for analysis.

The model, as generated by controller 110, may track an average path of some or all messages across network 150 between user devices 120, where a path includes all users and messages that are sent as a result of a first instantiating message. The average path as captured by the model may include an average number of users that are included in the complete path, an average number of messages total that are within the complete path, an average total amount of time taken between the instantiating message and the final message, an average amount of time between each two subsequent messages, or the like.

Further, in some examples, controller 110 may generate model data that includes a shape data of the communication. For example, shape data may include a graphical display of communication, where users are graphically and/or visually depicted as nodes that are relatively larger, smaller, and/or different colors based on communication characteristics of the user. For example, a user may be represented by a relatively larger node if the user receives and/or sends more messages. Similarly, a user may be represented by a first color if the user responds to messages relatively quickly, and a user may be represented by a second color if the user responds to messages relatively slowly (e.g., with gradient colors in between indicating different amounts of responsiveness between the two extremes).

In certain examples, controller 110 may generate a model with shape data such that users are arranged at different locations to indicate information on the users. For example, a set of users may be located adjacent to each other to indicate that each user of the set works together or holds similar roles. Specifically, controller 110 may cluster together users that have similar titles, similar knowledge sets, or have similar access to various organizational datastores.

Controller 110 may compare current communication against the model in order to identify if the current communication is relatively less efficient than possible communication of the model. For example, controller 110 may detect a current communication between a first user and a second user, where the current communication includes one or more messages between a first user operating a first user device 120 and a second user operating a second user device 120. Controller 110 may detect this current communication before it is sent over network 150. For example, controller 110 may detect current communication via a computing agent on user device 120 of the user that sent the message. Alternatively, or additionally, controller 110 may detect the current communication en route between a first user and a second user. For example, controller 110 may detect current communication via an agent that monitors communication over network 150. Alternatively, or additionally, controller 110 may detect the current communication once it is received by the second user, such as via a computing agent on user device 120 of the user that received the message, and/or a computing agent on hosting server 130 that hosted the platform over which the message was sent.

Once detected, controller 110 may compare the current communication against historical communication of the model to determine an efficiency of the communication. Controller 110 may compare the current communication to communication of the model by matching one or more sending users and/or receiving users of the communication with sending and/or receiving users of the model. Further, in some examples, controller 110 may compare the current communication to communication of the model by comparing a general topic of the current communication (e.g., as determined using NLP techniques) to a topic of the communication of the model. Controller 110 may determine that current communication is relatively less efficient if the current communication is equivalent to communication of the model that has been less efficient.

Figure 2A:
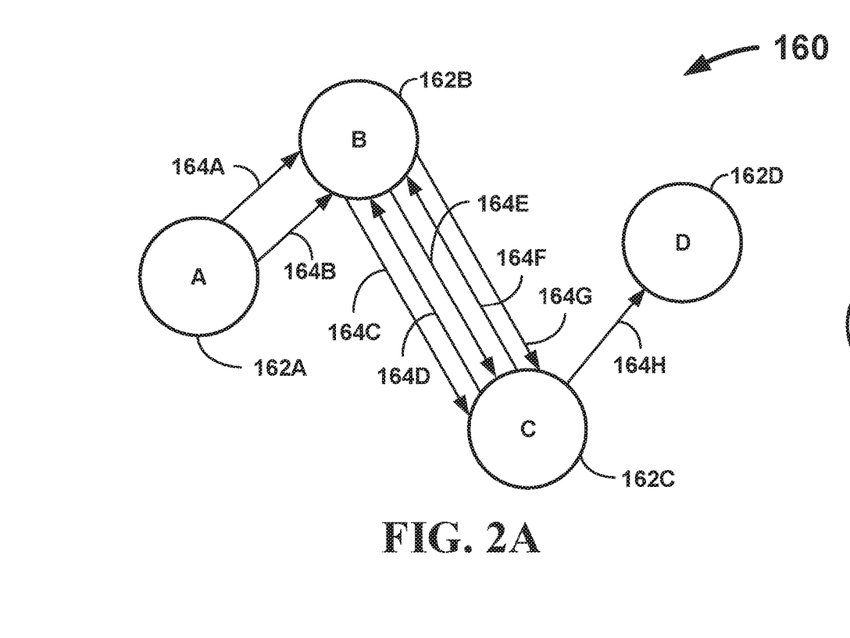
FIG. 2A depicts a conceptual illustration of example inefficient communication between users of a media platform.

For example, FIG. 2A depicts a conceptual depiction of inefficient communication 160 between four users 162A-162D (collectively referred to as "users 162"). Users 162 may each be a unique human that uses a unique profile within the one or more media platforms. For example, where the media platform includes email, each of users 162 may have a unique email address. For another example, where the media platform includes a social media platform across which users 162 may chat or share a video conference or the like, each of users 162 may have a distinct username, profile, online avatar, or the like. Users 162 each be utilize a respective user device 120 to access one or more media platforms as hosted on one or more hosting servers 130 to carry out communication with the other users 162. Thus, it is to be understood that discussion herein of sending messages or communications between users 162 involves the use of respective user devices 120 communicating over one or more media platforms hosted on one or more hosting servers 130.

Inefficient communication 160 may include a plurality of individual messages 164A-164H (collectively referred to as "messages 164") between respective users 162. Messages 164 may include discrete amounts of data sent between respective users 162, such as a textual sentence or phrase or document, a verbal (e.g., audio) comment, a graphical icon or set of images (e.g., a gif with a readily understood meaning), or the like. Controller 110 may be configured to identify each of messages 164 as a distinct message. For example, controller 110 may utilize natural speech-to-text techniques and/or language processing (NLP) techniques to identify and/or quantify data sent between users 162 as messages 164. It is to be understood that specific arrangement of users 162 and messages 164 as depicted in FIG. 2A is for purposes of example only, as other inefficient communication that includes more or less users 162 and/or more or less messages 164 are within the scope of this disclosure.

Controller 110 may identify one or more particular aspects of communication that are inefficient. For example, controller 110 may identify that user 162A sends a plurality of messages 164A, 164B to user 162B before user 162B responds. In some examples, controller 110 may utilize a communication model to identify inefficient communication 160 in response to a plurality of unanswered messages 164A, 164B (e.g., such that controller 110 may be configured to identify an instance of multiple unanswered messages 164 as inefficient communication 160). Controller 110 may identify this as inefficient as a communication model includes a predetermined threshold that indicates that more than one unanswered message is inefficient, and/or controller 110 may identify this as inefficient as a historical communication model indicates that many messages are answered after one message (e.g., such that an unanswered message is relatively inefficient in comparison).

In other examples, controller 110 may identify inefficient communication in response to the plurality of unanswered messages 164A, 164B over a period of time that passes a threshold such as a day or a week. For example, controller 110 may not identify messages 164A, 164B as inefficient communication 160 if both were sent within thirty minutes (e.g., such that user 162B only had thirty minutes to respond and had not yet exhibited inefficient communication), but controller 110 may identify messages 164A, 164B as inefficient communication if there was a three-day delay between the two messages 164A, 164B. The time threshold may be a predetermined amount of time as saved in the communication model, or the time threshold may be a determined amount of time as generated by controller 110 to indicate a standard (or perhaps slightly slower than standard) response time.

In some examples, controller 110 may identify one or both of messages 164A, 164B as inefficient communication 160 even if controller 110 does not detect the other of messages 164A, 164B if there is not a follow-up from user 162B. For example, user 162A may send message 164A to user 162B, after which user 162B does not respond within three days. Controller 110 may identify message 164A and this subsequent delay without response as inefficient communication 160 as a result of detecting that the three-day delay exceeds a threshold (e.g., where the threshold was 48 hours), such as a threshold of the model as described above.

In some examples, controller 110 may identify both messages 164A, 164B even if the two messages 164A, 164B were sent over separate platforms. For example, controller 110 may identify first message 164A as an email sent on a Monday and second message 164B as a textual message sent over a separate chatting application on the subsequent Tuesday. Controller 110 may utilize one or more natural language processing (NLP) techniques to identify that second message 164B relates to first message 164A.

Controller 110 may further identify messages 164C-164G as inefficient communication 160. Controller 110 may identify messages 164C-164G as inefficient as a result of a plurality of back-and-forth messages. For example, controller 110 may detect that the five messages 164C-164G exceeds a threshold of, e.g., three messages, such that the five messages 164C-164G are part of inefficient communication 160. As described above, controller 110 may detect messages 164C-164G across a single media platform as hosted by a plurality of hosting servers 130 or across a plurality of platforms. Further, as described above, this threshold may be a stored predetermined number within a communication model, and/or this threshold may be a dynamically determined number that controller 110 generates to be above or in-line with a baseline behavior of historical communication across network 150.

In some examples, controller 110 may identify messages 164 as indicating inefficient communication 160 through a general scale of messages 164. For example, controller 110 may identify that the eight messages 164 exceeds a threshold of, e.g., five messages across all users. For another example, controller 110 may identify that messages 164 that go between four eventual participating users 162 (e.g., a number of users 162 that are included in string of messages 164 prior to the issue of the messages 164 being resolved) exceed a threshold of, e.g., three eventual participating users 162.

Similarly, controller 110 may identify that messages 164 indicated inefficient communication 160 as a result of a general lapse of time between a first message 164A and a final message 164H. For example, even where each of message 164 was sent within, e.g., 24 hours of a preceding message 164, controller 110 may determine that messages 164 across users 162 indicate inefficient communication 160 as a result of a total time between first message 164A and last message 164 exceeding a threshold of, e.g., 7 business days. In other examples, controller 110 may evaluate and weight a plurality of factors such as shape, scale, duration, and the like to determine that messages 164 as sent between users 162 indicate inefficient behavior 160. Similar to what is described above, each of these example thresholds or factors may be predetermined within a communication model, and/or they may be dynamically determined numbers that are generated by controller 110.

Once controller 110 determines that communication is relatively less efficient, controller 110 may redirect the communication towards a determined potential communication that is determined to be relatively more efficient. Controller 110 may determine a relatively more efficient path utilizing database 140. For example, controller 110 may identify a stored communication path within database 140 that is associated with more efficient metrics than the current communication path.

Figure 2B:
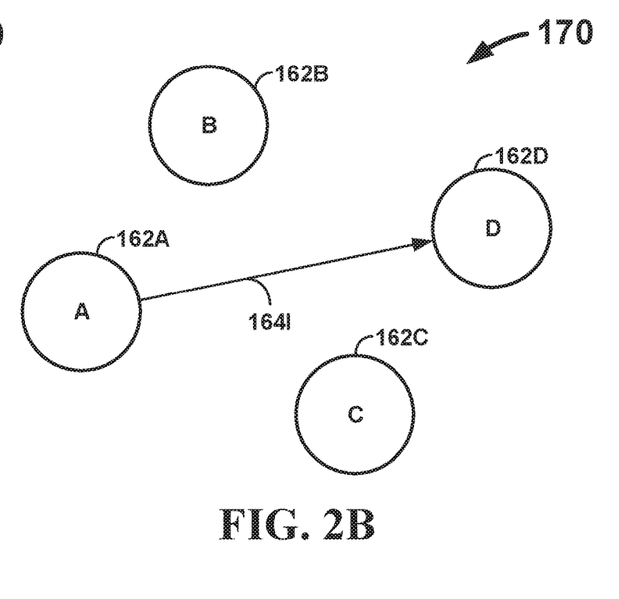
FIG. 2B depicts a conceptual illustration of example efficient communication between users of a media platform.

For example, FIG. 2B depicts a conceptual illustration of efficient communication 170 between user 162A and user 162D that includes message 164I. Controller 110 may identify that message 164I between user 162A and user 162D is efficient communication 170 because the number of messages 164 (e.g., one) is below a threshold, the number of participating users 162 (e.g., two) is below a threshold, the delay between messages 164 is below a threshold, or the like. Though only one message 164 and two users 162 are depicted for purposes of clarity, in some examples controller 110 may identify more messages 164 and/or users 162 as part of a suggested efficient communication 170 path.

Controller 110 may redirect some or all communication to a determined potential be more aligned with efficient communication 170. For example, controller 110 may suggest message 164I as directed to user 162D. Controller 110 may suggest message 164I in response to detecting currently inefficient communication 160. Put differentially, in some examples controller 110 may only redirect communication in response to determining that ongoing communication is already determined to be inefficient as described herein. In other examples, controller 110 may suggest efficient communication 170 in response to detecting a message that correlates with patterns of inefficient communication 170. For example, controller 110 may suggest message 164I in response to detecting first message 164A. Controller 110 may suggest message 164I immediately upon detecting first message 164A (e.g., before there is sufficient time for first message 164A to be inefficient).

In some examples, controller 110 may autonomously (e.g., without human intervention) redirect first message 164A to user 162D. Controller 110 may cause message 164A to go to user 162D instead of or in addition to user 162B. Controller 110 may notify user 162A that their message is being redirected. Controller 110 may reference database 140 to determine whether or not to autonomously redirect messages. For example, database 140 may include user preferences such that some users prefer for their messages to be autonomously redirected. For another example, database 140 may include topical preferences, such that message related to some topics (as determined using NLP techniques) may be redirected, regardless of what the user is sending them.

Further, in some examples, controller 110 may generate one or more reports that relate to inefficient communication 160. For example, controller 110 may generate reports that identifies users 162 that are regularly associated with inefficient communication. Controller 110 may generate the reports in such a way that the reports may indicate the type of inefficiency, whether related to a lack of responsiveness, a plurality of subsequent non-resolving messages 164, or any of the other inefficiencies described herein. In certain examples, controller 110 may generate such a report on a schedule (e.g., generate the report once a week or once a month or the like), generate such a report in response to a user prompt, and/or generate such a report in response to a change in communication (e.g., a change that is sufficient to change baselines and therein change thresholds that are based off of baselines). Controller 110 may generate and provide this report to one or more administrators. For example, controller 110 may email this report to one or more managers or executives or the like that are associated with users 162.

Figure 3:
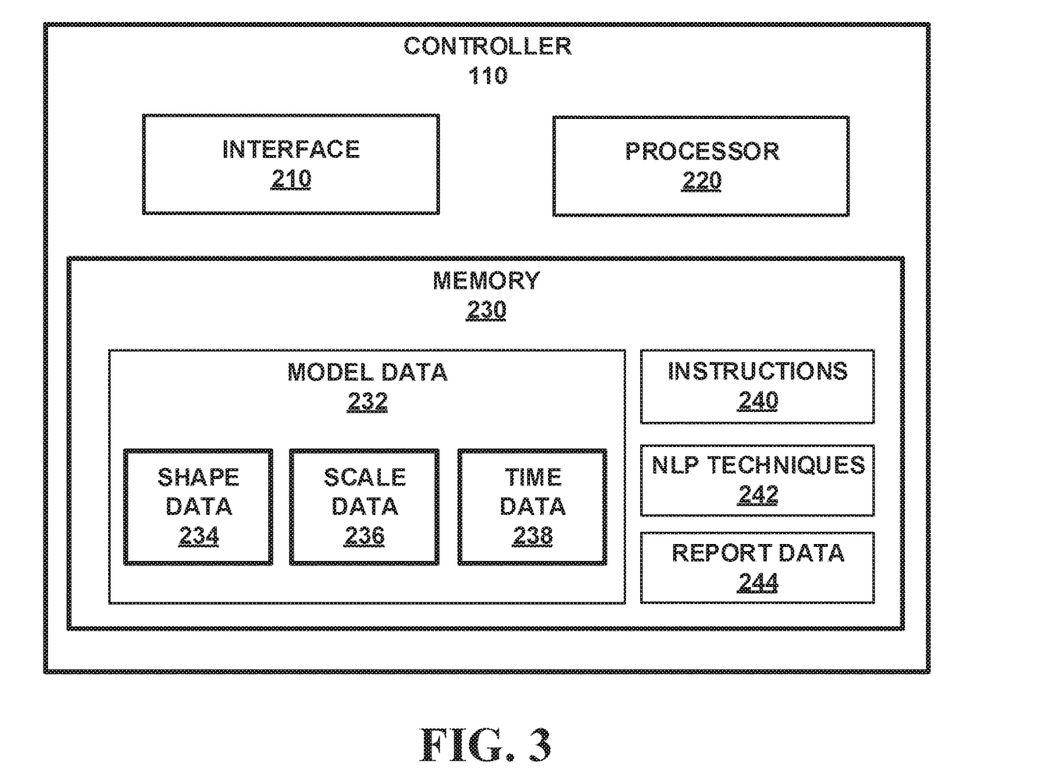
FIG. 3 depicts a conceptual box diagram of a computing system that may be configured to manage media communication.

As described above, controller 110 may include computing device 200 with a processor configured to execute instructions stored on a memory to execute the techniques described herein. For example, FIG. 3 is a conceptual box diagram of such computing device 200 of controller 110. While controller 110 is depicted as a single entity (e.g., within a single housing) for the purposes of illustration, in other example controller 110 may include two or more discrete physical systems (e.g., within two or more discrete housings). Controller 110 may include interfaces 210, processor 220, and memory 230. Controller 110 may include any number or amount of interface 210, processor 220, and/or memory 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, host servers 130, database 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage communication across media platforms such as described above. Controller 110 may utilize processor 220 to manage communication across media platforms. Processor 220 may include, for example, microprocessors, digital signal processors (DSPs), application specific integrated circuits (ASICs), field-programmable gate arrays (FPGAs), and/or equivalent discrete or integrated logic circuit. Two or more of processor 220 may be configured to work together to manage communication across media platforms.

Processor 220 may manage communication across media platforms according to instructions 240 stored on memory 230 of controller 110. Memory 230 may include a computer-readable storage medium or computer-readable storage device. In some examples, memory 230 may include one or more of a short-term memory or a long-term memory.

Memory 230 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 220 may manage communication across media platforms according to instructions 240 of one or more applications (e.g., software applications) stored in memory 230 of controller 110.

In addition to instructions 240, in some examples gathered or predetermined data or the like as used by processor 220 to manage communication across media platforms may be stored within memory 230. For example, memory 230 may include information described above that may be stored in database 140, such as one or more models of communication saved as model data 232, which may be used to determine trends and baselines of communication across media platforms.

Figure 4:
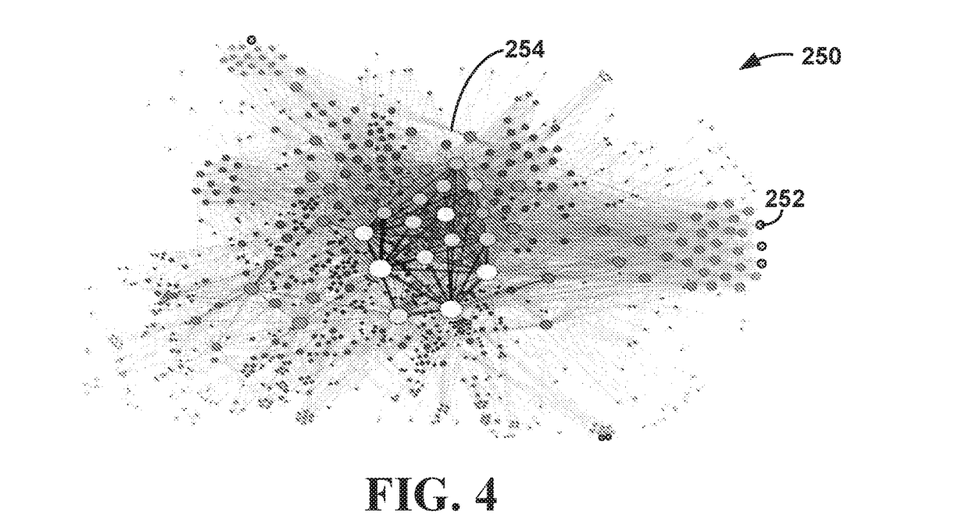
FIG. 4 depicts an example illustration of a shape of communication as captured by a media communication model.

Model data 232 may include shape data 234. Shape data 234 may include a general shape of communication across users of one or more media platforms as determined according to one or more modeling techniques. For example, FIG. 4 depicts shape 250 of communication across one or more media platforms as generated using techniques known in the art. Shape 250 may include a plurality of nodes 252 that may indicate users of the media platform. Nodes 252 may be different sizes and/or different colors depending upon communication characteristics of the users that nodes 252 represent. For example, nodes 252 may be different sizes and/or color gradations to indicate how frequently communication is routed through them and/or how quickly the respective user respond or the like. Further, in some examples, nodes 252 may be spaced close to or away from each other to indicate a place within an organization chart and/or an amount of intercommunication (e.g., such that users are located closer to those users that they tend to communicate with most frequently) or the like. Shape data 250 may further include connection lines 254 between nodes 252. Each of connection lines 254 may include respective messages or the like.

Looking back to FIG. 3, controller 110 may analyze relative sizes, colors, distances, or the like to determine communication trends. For example, controller 110 may use metadata on two nodes 252 to determine that the two nodes 252 have similar roles, and controller 110 may further determine that one node 252 is substantially larger (indicating that communication is sent to that node 252 far more frequently). Controller 110 may therein intermittently suggest redirecting communication to the equivalent and lesser-used node 252 when the more-used node becomes associated with temporary inefficiency. Alternatively, or additionally, controller 110 may store this information in report data 244, so that controller 110 generates a report as described herein according to instructions 240 this potential inefficiency may be reported to one or more individuals that may address this potential inefficiency.

Model data 232 may also include scale data 236. Scale data 236 may include data related to how many users (e.g., users 162) and/or messages (e.g., messages 164) relate to certain types of messages. For example, controller 110 may determine that a current message is related to a historical set of messages that, according to scale data 236, result in a relatively high number of users and/or messages, and therein determine that the current message is likely to be relatively less efficient. Once determined, controller 110 may store some or all of this potential inefficiency in report data 240.

Controller 110 may therein redirect the current message along a route that, according to stored scale data 236, relates to relatively less users and/or messages (and therein is determined to be relatively more efficient).

Model data 232 may also include time data 238. Time data 238 may include an amount of time that messages take. For example, controller 110 may determine that a current message is related to a historical set of messages that take a relatively long time to be finalized according to time data 238. In response to this, controller 110 may redirect the current message to a relatively more efficient path.

Each of shape data 234, scale data 236, and time data 238 may further include thresholds as described herein that indicate whether or not communication is efficient. For example, thresholds may include user thresholds (e.g., such that when communication includes more than the threshold number of users the communication becomes inefficient), message thresholds (e.g., such that when communication includes more than the threshold number of message the communication become inefficient), time thresholds (e.g., such that when the communication takes longer than the threshold amount of time the communication becomes inefficient), or the like. These thresholds may be either predetermined, dynamically generated and therein dynamically updated, or some combination of the two (initially predetermined and then dynamically updated per model data 232). Memory 230 may also include NLP techniques 242. Controller 110 may utilize NLP techniques 242 as stored in memory 230 to understand a general concept of a message, and therein to correlate two or more messages within one or more media platforms. For example, NLP techniques 242 can include, but are not limited to, semantic similarity, syntactic analysis, and ontological matching. For example, in some embodiments, processor 220 may be configured to parse messages to determine semantic features (e.g., word meanings, repeated words, keywords, etc.) and/or syntactic features (e.g., word structure, location of semantic features in headings, title, etc.). Ontological matching could be used to map semantic and/or syntactic features to a particular concept. The concept can then be used to determine the subject matter. In this way, using NLP techniques 242, controller 110 may identify two or more messages as correlated across one or more media platforms.

Figure 5:
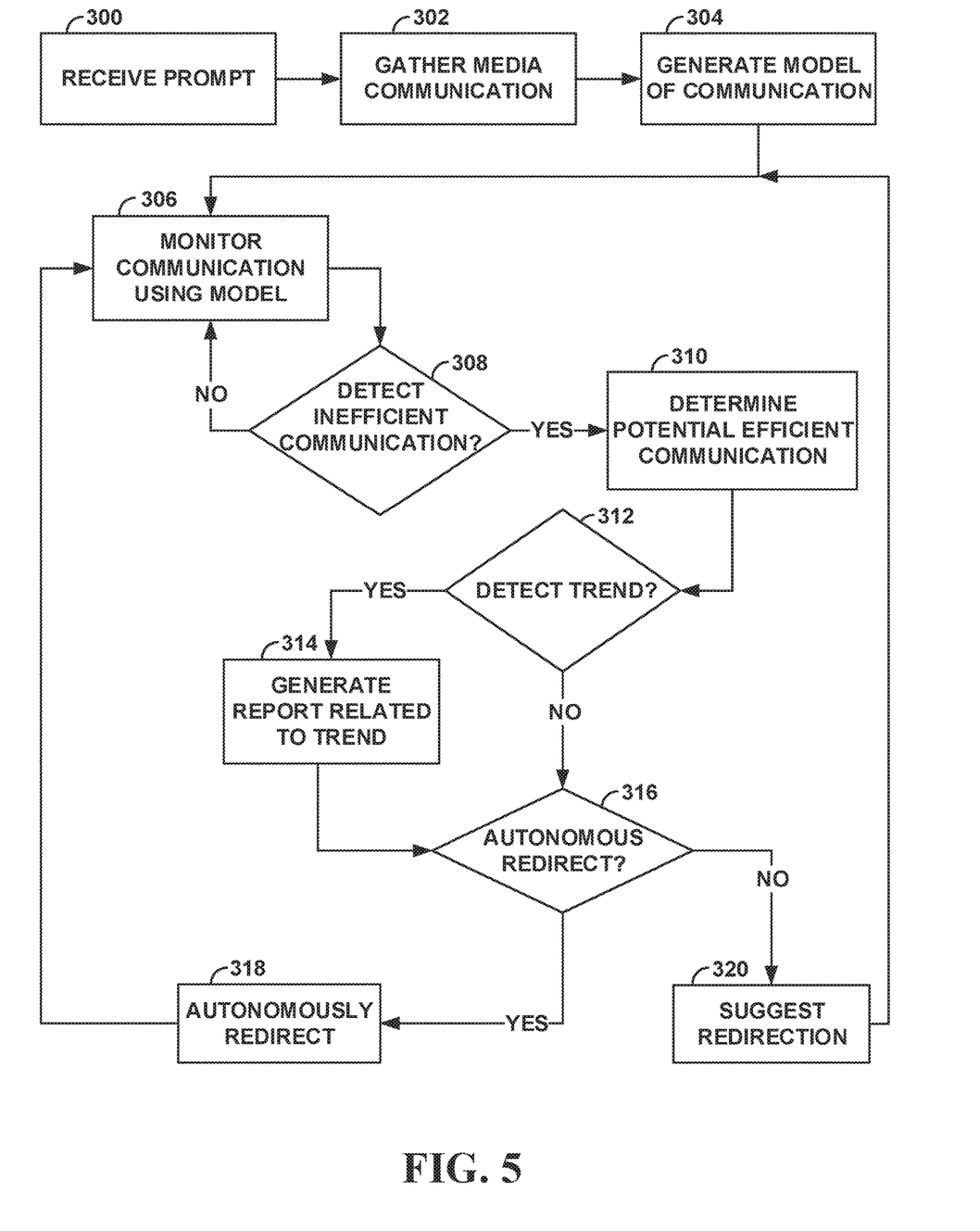
FIG. 5 depicts an example flowchart of managing communication across one or more media platforms.

Using these components, controller 110 may manage communication across media platforms as discussed herein. For example, controller 110 may manage communication across media platforms according to the flowchart depicted in FIG. 5. The flowchart of FIG. 5 is discussed with relation to FIG. 1 for purposes of illustration, though it is to be understood that other systems may be used to execute the flowchart of FIG. 5 in other examples. Further, in some examples, system 100 may execute a different method than the flowchart of FIG. 5, or system 100 may execute a similar method with more or less steps, in a different order, or the like.

A prompt is received (300). The prompt may be to monitor communication across one or more media platforms. Alternatively, the prompt may be related to a new media platform being initialized within system 100. In response to the prompt, controller 110 gathers communication across the media platforms (302). Gathering the data may include having some or all messages sent across the media platforms sent to controller 110, or controller 110 otherwise affirmatively gathering some or all data being sent across network 150. Once the communication data is gathered, controller 110 generates a model of the communication data across the media platforms (304). Controller 110 may generate the model by identifying the trend of messages between users over time. The model may include shape data, scale data, and time data as described herein. Controller 110 may identify one or more thresholds that determine communication efficiency as part of generating the model.

Controller 110 may monitor communication of users on the media platforms using the model (306). For example, controller 110 may compare current communication against stored communication of the model and identify stored communication that matches the best with the current communication. As described herein, current communication as monitored by controller 110 may include one or more messages that are being sent between users when controller 110 detects them. Alternatively, or additionally, current communication may include one or more messages that have recently (e.g., within a few seconds or minutes or hours) been sent over network 150 between two users using two user devices 120.

Controller 110 may determine whether or not this current communication across the platforms is inefficient (308). For example, once controller 110 correlates the current communication with stored communication of the model, controller 110 determines whether the stored communication is efficient. Controller 110 may determine that the stored communication is efficient by determining whether the stored communication satisfies one of the (predetermined and/or dynamically updated) thresholds of the model as described herein. If controller 110 determines that the stored communication is inefficient (e.g., as a result of the stored communication failing to satisfy one or more thresholds), controller 110 may likewise determine that the current communication is inefficient.

In other examples, controller 110 may determine whether current communication is inefficient by determining whether or not the current communication is satisfying thresholds determined from the model without comparing the current communication to any specific stored communication. For example, controller 110 may monitor communication and gather communication details to create a model that accurately depicts baselines of communication between users of social media platforms across network 150. Controller 110 may then determine thresholds that reflect the baselines of efficiency, such that communication which does not meet these baselines is determined to be efficient. Controller 110 may therein analyze any detected current communication using these thresholds of the model (e.g., rather than comparing the current communication against the stored communication), therein determining that the current communication is inefficient when it fails to satisfy these thresholds.

Further, in some examples, controller 110 may be configured to both compare the current communication against specific stored communication of the model as well as comparing the current communication against thresholds of the model that are derived from stored communication. For example, controller 110 may be configured to identify that a first user sending a plurality of messages to a second user without a response fails a threshold of a model, and controller 110 may do this without ever comparing any of the plurality of messages to a stored message of the model. Further, the same controller 110 may be configured to identify that a single message sent from a first user to a second user corresponds with messages within the model that are inefficient (e.g., where the model indicates that the second user frequently takes too long to respond to the first user), such that controller 110 may determine that this single message is inefficient. In some examples, controller 110 may determine this even if the single message may pass one or many or all threshold of the model that are derived from the stored communication (e.g., being as a single message sent between two users before a substantial amount of time has passed may, on its own, pass one or many or all thresholds of the model).

Upon detecting inefficient communication, controller 110 may determine potential efficient communication (310). In some examples, determining potential efficient communication may be substantially similar to detecting inefficient communication. For example, where there are two primary users that a message may be directed to (e.g., as determined by an organization chart that dictates who may receive certain messages), and one of the two primary users is relatively inefficient, the other user may therein be logically determined to be efficient.

In other examples, controller 110 may analyze the model to determine potential efficient communication. For example, in response to determining that current communication is inefficient, controller 110 may analyze the generated model to determine how previously inefficient communication was resolved. Looking to FIG. 2A, controller 110 may determine that inefficient communication 160 was resolved once message 164H was sent to user 162D. Identifying this, controller 110 may determine that user 162D is associated with efficient communication, and therein controller 110 may identify potential efficient communication 170 of FIG. 2B.

Additionally, or alternatively, controller 110 may be configured to identify possible sources of communication that have not been previously executed within its model. For example, controller 110 may identify equivalent users that communication may be directed to that are currently being underutilized. Specifically, controller 110 may identify that two users hold substantially similar roles, and that one of these users is currently experiencing a relatively high degree of incoming messages, while the other of these users is currently experiencing a relatively low degree of incoming messages. In this example, if controller 110 detects that a message to the first user is inefficient (e.g., if a message to the first user has been unanswered for a threshold amount of time, even if the first use had previously been relatively responsive according to the model), controller 110 may determine that the second user may be a potentially efficient communication option, even if the originating user had never communicated directly with the second user previously.

In some examples, if controller 110 detects inefficient communication as described herein, controller 110 may determine whether inefficient communication is part of a trend (312). Controller 110 may determine that inefficient communication is part of a trend if the inefficient communication happens more than a threshold number of times across the same users or across similar groups of users.

Where controller 110 determines that the inefficiency is part of a trend, controller 110 may generate a report related to this trend (314). This report may detail the users that are involved in the inefficiency. The report may also detail the contents of the message, and the reason why controller 110 determined that the message was inefficient. Controller 110 may provide this report to one or more administrators that are authorized to view the report.

Controller 110 may determine whether or not autonomous redirection is selected (316). Controller 110 may check database 140 or internal memory of controller 110 to determine whether or not to autonomously redirect the message. For example, controller 110 may determine to autonomously redirect the message if such an option was selected for for the user that sent the message, and/or controller 110 may determine to autonomously redirect based on the subject of the message or based on metadata of the message (e.g., if a "high importance" flag is selected, controller 110 may autonomously redirect the message to what is determined to be the most efficient communication path). For another example, controller 110 may determine to autonomously redirect the message based on a determined confidence score of the potential efficient communication. For example, where controller 110 determines that there is a relatively high confidence score associated with the potential efficient communication (indicating that there is a relatively high likelihood that the potential efficient communication is substantially more efficient than the current communication), controller 110 may determine to autonomously redirect the message (318). Alternatively, where a confidence score of the determined potential efficient communication is relatively lower (or autonomous redirection is otherwise not selected as described herein), controller 110 may determine to suggest (rather than autonomously redirect) the redirection (320).

Whether or not the communication is autonomously redirected, in some examples, the current communication may still be sent along the path of the current communication, such that the communication is both sent to the current communication as well as sent to the potential efficient communication. In other examples, the current communication may be effectively stopped in response to a (suggested or autonomous) redirection, such that the message is only sent along the path of the determined potential efficient communication. Whether or not autonomous redirection or redirection suggestion is executed, after a redirection action is taken controller 110 may continue monitoring communication for inefficient communication (306).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
gathering data related to communication between a plurality of users of a single organization on one or more media platforms;
generating, by using the data, a model of the communication that reflects communication trends between at least two of a first user and a second user and a third user of the plurality of users such that the model captures trends and average numbers of messages and numbers of users of the plurality of users that are involved in historical communication between at least two of the first and second and third user as well as a timing of the communication between at least two of the first and second and third user;
determining, by using the model to compare historical communication of the first user and the second user to historical communication of the first user and the third user, that a current communication between the first and second user of a single one of the one or more media platforms is relatively less efficient than a potential communication between the first user and third user of the single one of the one or more media platforms as a result of the model indicating a higher probability of at least one of an increased number of messages or an increased number of users or a suboptimal timing of the communication; and
directing, in response to determining that the current communication is relatively less efficient than the potential communication, the current communication to the third user.

2. The method of claim 1, further comprising directing the current communication to the third user by generating a message for the first user to direct the current communication to the third user.

3. The method of claim 1, further comprising directing the current communication to the third user by autonomously directing the current communication to the third user.

4. The method of claim 1, wherein:
the timing of the communication includes time delays between communication; and
determining that the current communication is relatively less efficient than the potential communication includes determining that the model indicates that the current communication relates to relatively longer time delays than the potential communication.

5. The method of claim 1, wherein:
the number of messages includes average amounts of back-and-forth exchanges during communication; and
determining that the current communication is relatively less efficient than the potential communication includes determining that the model indicates that the current communication relates to a relatively greater number of back-and-forth exchanges than the potential communication.

6. The method of claim 1, wherein:
the number of users includes average numbers of eventual participating users within communication; and
determining that the current communication is relatively less efficient than the potential communication includes determining that the model indicates that the current communication relates to a relatively greater number of eventual participating users within communication than the potential communication.

7. The method of claim 1, wherein the model does not include communication between the first user and the third user, the method further comprising:
determining that the first user corresponds to a fourth user and the second user corresponds to the third user, and
determining that the current communication is relatively less efficient than the potential communication includes determining that the model indicates that communication between the first user and the second user is relatively less efficient than communication between the fourth user and the third user.

8. The method of claim 1, further comprising generating a report on one or more relatively less efficient communication trends identified using the model.

9. The method of claim 1, wherein generating the model of the communication includes using natural language processing (NLP) techniques to determine that a first message from the first user to the second user relates to a second message from the second user to the first user.

10. The method of claim 1, wherein generating the model includes using NLP techniques to determine that a first message from the first user to the second user relates to a second message from the second user to the third user.

11. The method of claim 1, wherein generating the model includes using NLP techniques to determine that a first message from the first user to the second user relates to a second message from the third user to a fourth user.

12. A system comprising:
a processor; and
a memory in communication with the processor, the memory containing instructions that, when executed by the processor, cause the processor to:
   gather data related to communication between a plurality of users of a single organization on one or more media platforms;
   generate, using the data, a model of the communication that reflects communication trends between at least two of first user and a second user and a third user of the plurality of users such that the model captures trends and average numbers of messages and numbers of users of the plurality of users that are involved in historical communication between at least two of the first and second and third user as well as a timing of the communication between at least two of the first and second and third user;
   determine, using the model to compare historical communication of the first user and the second user to historical communication of the first user and the third user, that a current communication between the first and second user of a single one of the one or more media platforms is relatively less efficient than a potential communication between the first user and third user of the single one of the one or more media platforms as a result of the model indicating a higher probability of at least one of an increased number of messages or an increased number of users or a suboptimal timing of the communication; and
   direct, in response to determining that the current communication is relatively less efficient than the potential communication, the current communication to the third user.

13. The system of claim 12, wherein directing the current communication to the third user includes generating a message for the first user to direct the current communication to the third user.

14. The system of claim 12, wherein directing the current communication to the third user includes autonomously directing the current communication to the third user.

15. The system of claim 12, wherein:
the timing of the communication includes time delays between communication; and
determining that the current communication is relatively less efficient than the potential communication includes determining that the model indicates that the current communication relates to relatively longer time delays than the potential communication.

16. The system of claim 12, wherein:
the number of messages includes average amounts of back-and-forth exchanges during communication; and
determining that the current communication is relatively less efficient than the potential communication includes determining that the model indicates that the current communication relates to a relatively greater number of back-and-forth exchanges than the potential communication.

17. The system of claim 12, wherein:
the number of users includes average numbers of eventual participating users within communication; and
determining that the current communication is relatively less efficient than the potential communication includes determining that the model indicates that the current communication relates to a relatively greater number of eventual participating users within communication than the potential communication.

18. The system of claim 12, wherein the model does not include communication between the first user and the third user, the memory further containing instructions that, when executed by the processor, cause the processor to:
   determine that the first user corresponds to a fourth user and the second user corresponds to the third user, and
   determine that the current communication is relatively less efficient than the potential communication includes determining that the model indicates that communication between the first user and the second user is relatively less efficient than communication between the fourth user and the third user.

19. A computer program product, the computer program product comprising a computer readable storage medium having program instructions embodied therewith, the program instructions executable by a computer to cause the computer to:
   gather data related to communication between a plurality of users of a single organization on one or more media platforms;
   generate, and using the data, a model of the communication that reflects communication trends between at least two of a first user and a second user and a third user of the plurality of users such that the model captures trends and average numbers of messages and numbers of users of the plurality of users that are involved in historical communication between at least two of the first and second and third user as well as a timing of the communication between at least two of the first and second and third user;
   determine, using the model to compare historical communication of the first user and the second user to historical communication of the first user and the third user, that a current communication between the first and second user of a single one of the one or more media platforms is relatively less efficient than a potential communication between the first user and third user of the single one of the one or more media platforms as a result of the model indicating a higher probability of at least one of an increased number of messages or an increased number of users or a suboptimal timing of the communication; and
   direct, in response to determining that the current communication is relatively less efficient than the potential communication, the current communication to the third user.

20. The computer program product of claim 19, wherein:
the current communication is redirected to the third user by either generating a message for the first user to direct the current communication to the third user or autonomously directing the current communication to the third user;
the timing of the communication includes time delays between communication, the number of messages includes average amounts of back-and-forth exchanges during communication, and the number of users includes average numbers of eventual participating users within communication; and
determining that the current communication is relatively less efficient than the potential communication includes at least one of:
   determining that the model indicates that the current communication relates to relatively longer time delays than the potential communication;

determining that the model indicates that the current communication relates to a relatively greater number of back-and-forth exchanges than the potential communication; and determining that the model indicates that the current communication relates to a relatively greater number of eventual participating users within communication than the potential communication.

\* \* \* \* \*